United States Patent
Jacobs

(12) 
(10) Patent No.: US 6,450,556 B1
(45) Date of Patent: Sep. 17, 2002

(54) UNDER-RIDE PROTECTION AIRBAG SYSTEM AND METHOD OF ITS USE

(75) Inventor: Tony J. Jacobs, Chesapeake, VA (US)

(73) Assignee: Lifesavers LLC, Virginia Beach, VA (US)

(*) Notice: Subject to any disclaimer, the term of this patent is extended or adjusted under 35 U.S.C. 154(b) by 0 days.

(21) Appl. No.: 09/851,119

(22) Filed: May 9, 2001

(51) Int. Cl.⁷ .............................................. B60R 19/20
(52) U.S. Cl. ......................... 293/107; 293/1; 293/117; 180/274
(58) Field of Search .................... 293/107, 108, 293/110, 117, 1, 132, 133, 134; 180/274

(56) References Cited

U.S. PATENT DOCUMENTS

| | | | | |
|---|---|---|---|---|
| 3,708,194 A | * | 1/1973 | Amit | 141/317 |
| 3,733,096 A | * | 5/1973 | Kassbohrer | 267/140 |
| 3,822,076 A | * | 7/1974 | Mercier | 180/274 |
| 3,907,353 A | | 9/1975 | Dinitz | |
| 3,923,330 A | * | 12/1975 | Viall et al. | 180/275 |
| 4,441,751 A | | 4/1984 | Wesley | |
| 5,646,613 A | * | 7/1997 | Cho | 180/167 |
| 5,725,265 A | | 3/1998 | Baber | |
| 5,732,785 A | * | 3/1998 | Ran et al. | 180/271 |
| 6,056,336 A | * | 5/2000 | Balgobin | 293/107 |
| 6,106,038 A | | 8/2000 | Dreher | |

FOREIGN PATENT DOCUMENTS

| | | | | |
|---|---|---|---|---|
| DE | 2017465 | * | 4/1970 | 293/107 |
| JP | 2-155854 A | * | 6/1990 | 293/107 |

* cited by examiner

Primary Examiner—Joseph D. Pape
Assistant Examiner—Patricia Engle
(74) Attorney, Agent, or Firm—Birch, Stewart, Kolasch & Birch, LLP

(57) ABSTRACT

An external vehicle airbag system (10), a method of its use and a principal vehicle (10) on which it is mounted involves mounting an airbag (16) at a bottom side (24) of the principal vehicle at a position spaced substantially laterally inwardly from a lateral-side periphery (27) of the principal vehicle. Also involved is a sensor (20) for being mounted on the principal vehicle at a position more laterally outwardly, in a direction toward the lateral-side periphery, than is the airbag. The sensor senses a collision of the principal vehicle with a colliding vehicle and, in response thereto, inflates the airbag below the principal vehicle, along the bottom thereof toward the lateral-side periphery, to thereby absorb energy from the colliding vehicle and prevent under-riding. In one embodiment, the sensor is positioned approximately at the lateral-side periphery and it can be mounted on a rigid under-ride guard.

6 Claims, 2 Drawing Sheets

UNDER-RIDE PROTECTION AIRBAG SYSTEM AND METHOD OF ITS USE

BACKGROUND OF THE INVENTION

This invention relates generally to systems and methods for reducing vehicle-collision injuries and damage and concerns more specifically such systems and methods that are particularly suitable for use with large vehicles, such as truck trailers, for preventing smaller vehicle from under-riding them.

Deployable interior airbags have been effective for protecting passengers inside vehicles and have, therefore, become mandatory equipment for vehicles. As an extension of this, it has been suggested to place deployable airbags on exteriors of vehicles for absorbing impact energy of colliding vehicles and thereby reducing damage to the vehicles. For example, each of U.S. Pat. No. 4,441,751 to Wesley; U.S. Pat. No. 5,725,265 to Baber; and U.S. Pat. No. 6,106,038 to Dreher describes a system for reducing collision damage by deploying an airbag on an exterior of a vehicle. The airbag system of Baber is mentioned as being particularly suitable for use with trucks and truck trailers. This system involves placing an airbag on a truck, which is depicted in FIG. 7. The airbag is inflated when a possible collision is perceived, by radar for example. This patent mentions that the invention described therein particularly helps a vehicle colliding with the principal truck on which the airbag is mounted, since an airbag inflates to cushion the colliding vehicle. The patent mentions both side and rear collisions and mentions that this system reduces liability claims for trucks.

Although the system described in U.S. Pat. No. 5,725,265 and the other prior-art patents mentioned above have advantages, they also present some difficulties. One such difficulty involves sensing that a collision is about to take place with enough certainty and lead time that an airbag has time to deploy in time to do some good. Several of the above-described prior-art patents suggest using radar or sonar (see U.S. Pat. 6,106,038 to Dreher and U.S. Pat. No. 5,725,265 to Baber), presumably to sense that a collision is imminent and trigger deployment of the airbag in time to provide a useful cushion. However, as can be imagined, such non-contact and imprecise sensing can be risky, sometimes triggering an expensive, unnecessary and dangerous airbag deployment.

Thus, it is an object of this invention to provide an airbag system, method and vehicle with such an airbag system, that provides a precise, reliable sensing of an imminent collision, while at the same time providing sufficient lead time for allowing an airbag enough time to inflate and cushion the impact of the colliding vehicle.

Large vehicles, such as truck cabs and trailers, pose a particular problem for motorists of smaller vehicles because the smaller vehicles, such as normal-size cars, can under-ride the larger vehicles. Such under-ride collisions are particularly dangerous for the occupants of the smaller vehicles because they can be thereby, decapitated, even though they may be wearing seat belts and are not driving at high speeds. To prevent such under-riding, some trucks have installed under-ride guards, or bumpers, mounted at their sides and back. These under-ride guards can have various shapes and forms, but quite often are simply rigid vertical and horizontal bars extending downwardly from the bottoms of truck trailers. Again, such under-ride guards can be at sides and backs of truck trailers. Although under-ride guards tend to reduce under-ride injuries, they are often not sufficiently strong to prevent under-ride during high-speed collisions. Another problem is that the under-ride guards themselves cause damage to smaller cars, because they, by their nature, are formed as rigid protrusions. Therefore, it is an object of this invention to provide an under-ride protection system that has added strength while also cushioning the impact of a collision.

U.S. Pat. No. 3,907,353 to Dinitz suggests using adjustable bumpers on vehicles having elevated bodies, with the adjustable bumpers including energy absorbers, or dissipaters. A disadvantage of such a system is that the adjustable bumper is unduly complicated and the dissipaters make it unduly bulky. Further, in order to make the bumper adjustable, one must make compromises between strength and functionality. It is therefore an object of this invention to provide an under-ride protection system that is not unduly complicated, bulky, non-functional or weak.

SUMMARY OF THE INVENTION

According to principles of this invention, an external vehicle airbag system for being mounted on a road-traveling principal vehicle includes an airbag to be inflated for absorbing the energy of a colliding vehicle and preventing the colliding vehicle from under-riding the principle vehicle. In this regard, the vehicle airbag system includes an airbag mount for mounting the airbag at a bottom side of the principal vehicle, substantially laterally inwardly spaced from a lateral-side periphery of the principal vehicle. The airbag system further includes a sensor for being mounted on the principal vehicle at a position more laterally outward, in the direction of the lateral-side periphery, than is the airbag. The sensor senses an imminent impact of the principal vehicle with the colliding vehicle and, in response thereto, inflates the airbag. Thus, as the colliding vehicle impacts the principle vehicle laterally, the airbag inflates below the principal vehicle, along the bottom thereof toward the lateral periphery, to thereby counter and absorb energy from the colliding vehicle to prevent its under-riding. In one embodiment, the sensor is positioned about at the lateral-side periphery and includes a rigid under-ride guard.

BRIEF DESCRIPTION OF THE DRAWINGS

Further benefits, characteristics and details of the invention are explained in more detail below using an embodiment shown in the drawings. The described and drawn features can be used individually or in preferred combinations in other embodiments of the invention. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
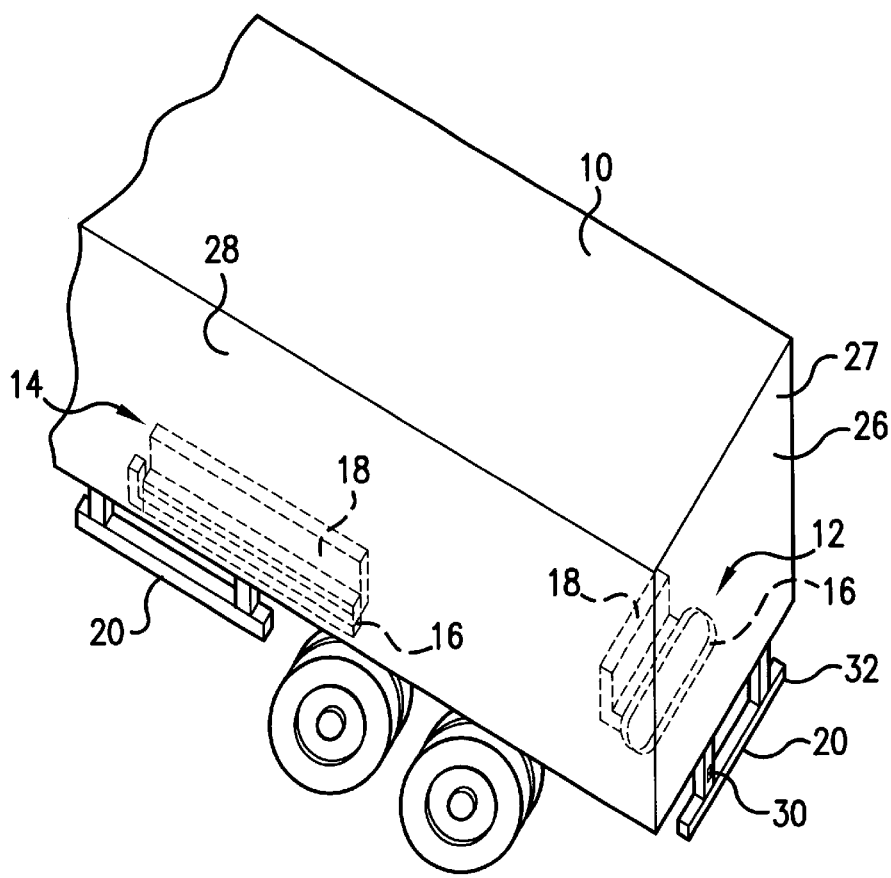
FIG. 1 is an isometric, cutaway, view of a truck trailer having rear and left-side airbag systems of this invention mounted thereon.
Figure 2:
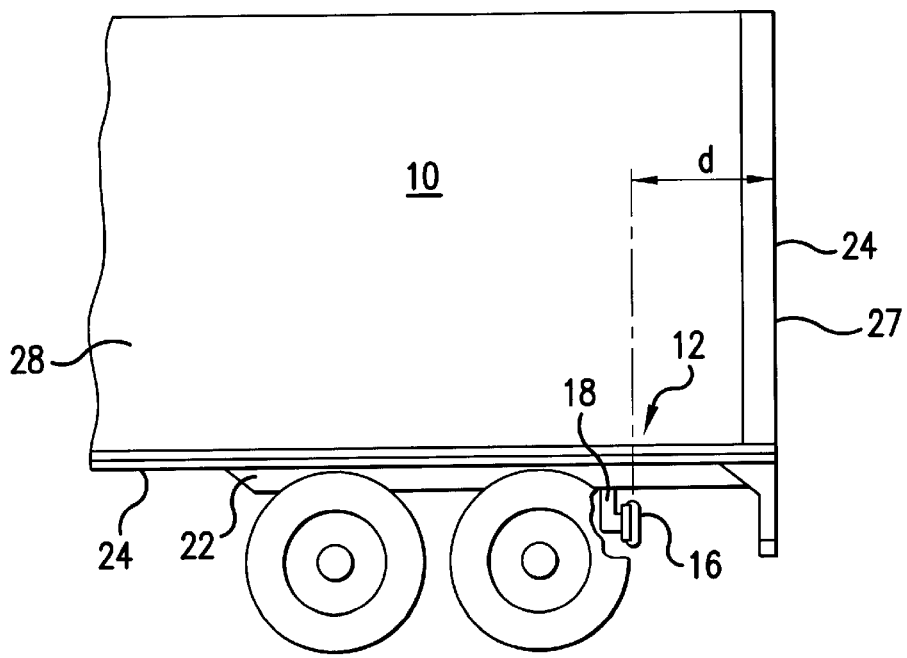
FIG. 2 is a side, cutaway, view of the structure of FIG. 1, but only showing the rear airbag system.
Figure 4:
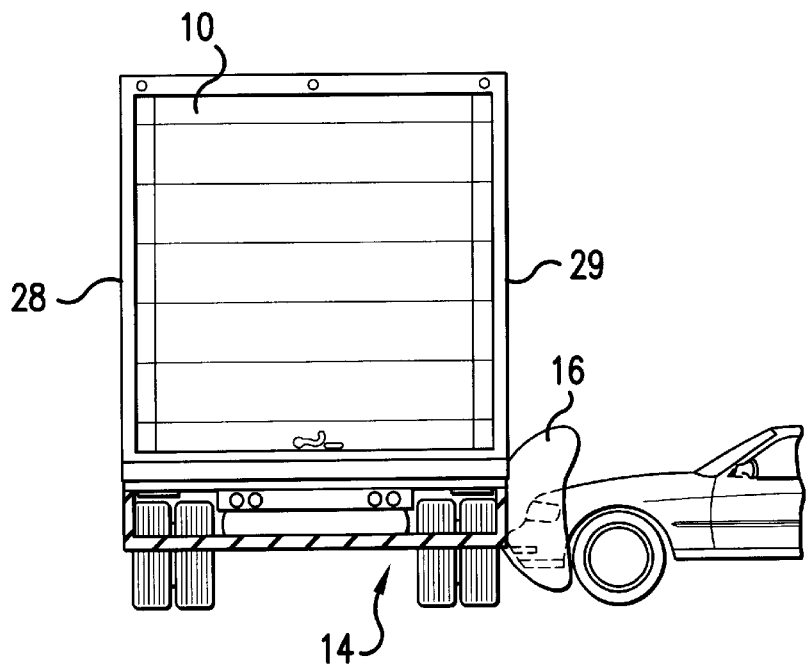
FIG. 4 is a rear view of a truck trailer with a right-side airbag system, with an airbag of the right-side airbag system being deployed by inflation.

A truck trailer or principal vehicle, 10 has mounted thereon two external vehicle airbag systems of this invention, namely, a rear airbag system 12 and a left-side airbag system 14. Each of the airbag systems includes an airbag 16, an airbag mount 18, and a sensor 20. For ease of description, the rear airbag system 12 will be described in detail, but it should be understood that the left-side airbag system 14 has essentially the same structure. Similarly, although only rear and left-side airbag systems are shown in FIG. 1, it should be understood that other airbag systems, facing in other relative directions, could be used with the truck trailer 10. In fact, FIG. 4 depicts deployment of an airbag from a right-side airbag system.

Describing now the rear airbag system 12 in more detail, the airbag mount 18 mounts the un-inflated airbag 16 to a frame 22 at a bottom 24 the truck trailer 10 so that the un-inflated airbag 16 is inwardly spaced a substantial distance "d" from a rear side 26 of the truck trailer 10. The bottom 24 faces a roadway on which the truck trailer 10 is traveling. In this regard, the truck trailer 10 has an outer, lateral-side periphery 27 formed of the rear side 26, a left side 28, a right side 29, and a front side (not shown). It should be understood, that the distance "d" is measured from that portion of the outer, lateral-side periphery of the truck toward which the airbag will expand when deployed, or inflated, in this case the rear side 26. Thus, if we were discussing the left-side airbag system 14, this distance "ad" would be measured from the left side 28. The distance "d" is at least 6 inches and preferably at least 1 foot. But in the depicted embodiment, it is around 1.5 feet and it could be as much as 4 feet. This distance is determined by an amount of space available below the bottom 24, a size of an inflated airbag, a speed at which the airbag inflates, and other related considerations, as will be further discussed below.

Looking now at the sensor 20 in more detail, in the depicted embodiment, this sensor is formed of a strain gauge 30 mounted on an under-ride guard 32 which is rigidly mounted on the frame 22 of bottom 24 of the truck trailer 10. When a colliding vehicle 34 taps the under-ride guard 32 sufficiently to strain, or bend, the under-ride guard 32, this is sensed by the strain gauge 30.

Figure 3:
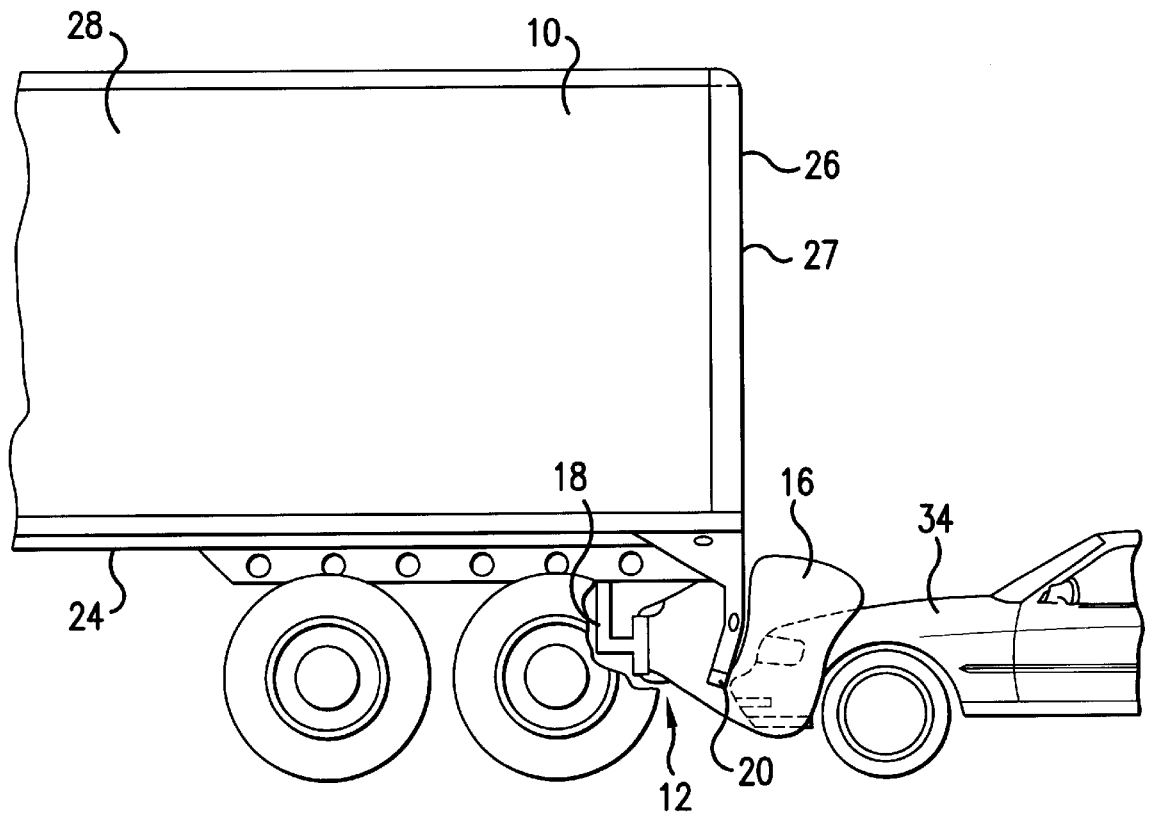
FIG. 3 is a view similar to FIG. 2, but with an airbag of the rear airbag system being deployed by inflation.

Describing now operation of the rear airbag system 12 of this invention, when a colliding vehicle 34 engages the under-ride guard 32, it strains it. The strain gauge 30 senses when the under-ride guard 32 has been strained a predetermined amount, it sends a signal to the airbag 16 of the rear airbag system 12, and the airbag responds thereto by inflating in the manner of vehicle airbags described in the prior-art patents mentioned above. As can be seen in FIG. 3, the rear airbag 16 expands, or inflates, in the direction of the rear side 26 and comes into contact with the under-ride guard 32, and thereby resiliently supports the under-ride guard 32 from further bending. Almost at the same time the inflating airbag also engages the colliding vehicle, under, around and through the under-ride guard, thereby providing a cushion for absorbing the impact of the colliding vehicle 34 and also preventing the colliding vehicle 34 from under-riding the truck trailer.

In the depicted embodiment, the under-ride guard 32 is relatively strong, thereby providing its own protection against the colliding vehicle under-riding the bottom 24 of the truck trailer 10. However, in another embodiment this member is rather weak, serving substantially only as a sensor for triggering deployment of the airbag 16. At the other extreme, it could be as strong as normal under-ride guards that do not have the under-ride airbag systems of this invention. Further, it would be possible to use a sensor that does not even contact the colliding vehicle 34, such as a light sensor that recognizes that the colliding vehicle has crossed a vertical plane sufficiently close to the rear side 26 that one can be certain that a collision is about to take place (such as a colliding vehicle protruding below a structural member forming the rear side 26). In this case there need not be an under-ride guard at all. But there are advantages to the sensor being activated by actual physical contact of the colliding vehicle, which signals that a collision is in progress.

An advantage of the vehicle airbag system of this invention is that it provides a reliable sensing of an imminent, or in-progress, collision, while at the same time providing a sufficient lead time to the airbag for allowing the airbag to inflate and cushion the impact of the vehicles, while also preventing a substantial under-ride of the colliding vehicle. The sensing is reliable in this system because a colliding vehicle is only sensed when it is so near, or at, a lateral-side periphery of the principal vehicle that a collision is assured. The sufficient lead time comes about because of the distance "d" between the lateral-side periphery and the airbag.

Another benefit of this invention is that it provides an under-ride protection system that has added strength and which significantly cushions the impacts of collisions of smaller vehicles with larger vehicles. This benefit further protects the riders of the smaller vehicles when they collide with trucks.

Similarly, this invention reduces liability costs for truck operators because it reduces damage and injury costs stemming from collisions of trucks with small vehicles.

Yet another advantage of this invention is that the undeployed airbag is substantially out of the way, since it is mounted below the principal vehicle, at the bottom thereof. That is, it does not protrude from or near the lateral-side periphery of the principal vehicle.

Although this invention has been described with reference to particular embodiments, it will be understood by those of ordinary skill in the art that various modifications are possible within the scope of this invention. For example, the airbag can be mounted in various ways, so long as it is below the principal vehicle and inset from the lateral-side periphery thereof.

Further, the sensor could have various forms. However, it is important that the sensor only be activated when it is virtually certain that a colliding vehicle will collide with the principal vehicle, such as by touching a sensor element mounted on the principal vehicle. A possible alternative would be establishing a specific vertical sensor plane near the lateral-side periphery, with a signal being triggered when it is broken.

It should be noted that the airbag system of this invention provides under-ride protection that is not unduly complicated, bulky or weak.

I claim:

1. An external vehicle airbag system for being mounted on a road-traveling principal vehicle having a bottom facing a road, a top, and a side periphery, said airbag system including:

an airbag for being inflated to absorb energy caused by impacts of colliding vehicles with said principal vehicle;

an airbag mount mounting said airbag at said bottom of said principal vehicle at a position spaced substantially inwardly from said lateral-side periphery of said principal vehicle;

a sensor being mounted on said principle vehicle at a position fixed more laterally outwardly than said airbag, in a direction toward said side periphery, said sensor for sensing an imminent collision of a colliding vehicle with said principal vehicle and, in response thereto, creating a signal for inflating said airbag;

whereby, as said colliding vehicle collides with said principal vehicle said airbag inflates below said principal vehicle, along the bottom thereof toward the side periphery, to thereby engage said colliding vehicle, absorbing energy therefrom, and thereby preventing said colliding vehicle from under-riding said principal vehicle.

2. The external vehicle airbag system of claim 1 wherein said sensor includes an under-ride guard which when touched by said colliding vehicle causes creation of said signal.

3. The external vehicle airbag system of claim 1 wherein said sensor is positioned approximately at the side periphery of said principal vehicle.

4. The external vehicle airbag system of claim 1, wherein said principal vehicle is a truck trailer.

5. A method of protecting a principal vehicle against being under-ridden by smaller colliding vehicles, said principal vehicle having a bottom side facing a road, a top side, and a side periphery, said method including:

mounting an airbag at said bottom side of said principal vehicle at a position spaced substantially inwardly from said side periphery of said principal vehicle;

mounting a sensor on said principal vehicle at a position fixed more outwardly than said airbag, said sensor for sensing a lateral collision of said colliding vehicle with said principal vehicle and, in response thereto, creating a signal for inflating said airbag;

whereby, as said colliding vehicle collides with said principal vehicle, said airbag inflates below said principal vehicle, along the bottom thereof toward the lateral-side periphery, to thereby engage said colliding vehicle, absorbing energy therefrom to prevent said colliding vehicle from under-riding said principal vehicle.

6. A method as in claim 5 wherein said sensor is mounted substantially at said side periphery.

* * * * *